United States Patent
Liu et al.

(10) Patent No.: US 9,357,453 B2
(45) Date of Patent: May 31, 2016

(54) HOME BASE STATION AND METHOD FOR SUPPORTING PLURALITY OF CELLS UNDER CARRIER AGGREGATION

(71) Applicant: Industrial Technology Research Institute, Hsinchu (TW)

(72) Inventors: Chia-Lung Liu, Hsinchu (TW); Kuei-Li Huang, Hsinchu (TW); Ching-Hsu Chang, Hsinchu (TW)

(73) Assignee: Industrial Technology Research Institute, Chutung, Hsinchu County (TW)

( * ) Notice: Subject to any disclaimer, the term of this patent is extended or adjusted under 35 U.S.C. 154(b) by 93 days.

(21) Appl. No.: 14/287,503

(22) Filed: May 27, 2014

(65) Prior Publication Data
US 2015/0172974 A1 Jun. 18, 2015

(30) Foreign Application Priority Data
Dec. 17, 2013 (TW) .............................. 102146551 A

(51) Int. Cl.
| | | |
|---|---|---|
| H04W 4/00 | (2009.01) | |
| H04W 36/00 | (2009.01) | |
| H04W 74/08 | (2009.01) | |
| H04L 5/00 | (2006.01) | |

(52) U.S. Cl.
CPC ............. *H04W 36/0083* (2013.01); *H04L 5/00* (2013.01); *H04W 36/0072* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 8,326,304 B2 | 12/2012 | Kim et al. | |
| 2011/0105129 A1* | 5/2011 | Kim ................. | H04W 36/0083 455/443 |

(Continued)

FOREIGN PATENT DOCUMENTS

| | | | |
|---|---|---|---|
| CN | 103096489 A | | 5/2013 |
| TW | 201242406 A | | 10/2012 |
| WO | WO-2013/028114 A1 | | 2/2013 |

OTHER PUBLICATIONS

Herranz et al., "Cognitive Radio Enabling Opportunistic Spectrum Access in LTE-Advanced Femtocells," IEEE International Conference on Communications (ICC), pp. 5593-5597 (2012).

(Continued)

*Primary Examiner* — Chi H Pham
*Assistant Examiner* — Fahmida Chowdhury
(74) *Attorney, Agent, or Firm* — McCarter & English, LLP; Yu Lu

(57) ABSTRACT

A home base station and method for supporting a plurality of cells under carrier aggregation. The home base station includes a preamble generator and a preamble monitor. The preamble generator allocates respective random access resources in the cells for handover to be carried out by a user equipment (UE), and upon receiving a handover request signal transmitted by a Mobility Management Entity (MME), generates a specific preamble and its transmission time, so that the UE performs random access on the cells based on the preamble and the transmission time to obtain the random access resources and sends out a Random Access Preamble (RAP). The preamble monitor enables the cells to simultaneously monitor the RAP sent by the UE, and when one of the cells receiving the RAP, identifies the cell on which the UE camps based on which one of the cells that has the RAP.

14 Claims, 4 Drawing Sheets

(56) References Cited

U.S. PATENT DOCUMENTS

| | | | |
|---|---|---|---|
| 2011/0292911 A1 | 12/2011 | Uemura et al. | |
| 2012/0100851 A1 | 4/2012 | Zheng et al. | |
| 2012/0309395 A1* | 12/2012 | Centonza | H04W 84/045 455/436 |
| 2013/0010711 A1* | 1/2013 | Larsson | H04W 56/0005 370/329 |
| 2013/0079021 A1 | 3/2013 | Centonza | |
| 2013/0100836 A1 | 4/2013 | Szufarska et al. | |

OTHER PUBLICATIONS

Hu et al., "A Distributed Inter-Cell Interference Coordination Scheme between Femtocells in LTE-Advanced networks," IEEE Vehicular Technology Conference (VTC Spring), pp. 1-5 (2011).

Wang et al., "Cooperative Component Carrier (Re-)Selection for LTE-Advanced Femtocells," IEEE Wireless Communications and Networking Conference (WCNC), pp. 629-634 (2011).

Wang et al., "A Cooperative Downlink Power Setting Scheme for CA-Based Femtocells," IEEE Vehicular Technology Conference (VTC Spring), pp. 1-6 (2012).

Yan et al., "A New Autonomous Component Carrier Selection Scheme for Home eNB in LTE-A System," IEEE Vehicular Technology Conference (VTC Spring), pp. 1-5 (2011).

Zheng et al., "Interference Coordination between Femtocells in LTE-Advanced Networks with Carrier Aggregation," International ICST Conference on Communications and Networking in China (CHINACOM), pp. 1-5 (2010).

English abstract of CN 103096489.

English abstract of TW 201242406.

* cited by examiner

HOME BASE STATION AND METHOD FOR SUPPORTING PLURALITY OF CELLS UNDER CARRIER AGGREGATION

CROSS-REFERENCE TO RELATED APPLICATIONS

This application claims foreign priority under 35 U.S.C. §119(a) to Patent Application No. 102146551, filed on Dec. 17, 2013, in the Intellectual Property Office of Ministry of Economic Affairs, Republic of China (Taiwan, R.O.C.), the entire content of which Patent Application is incorporated herein by reference.

TECHNICAL FIELD

The present disclosure relates to techniques for base stations for wireless transmission, and, more particularly, to a home base station and method for supporting a plurality of cells under carrier aggregation.

BACKGROUND OF THE INVENTION

In the applications of high bandwidth and high data transfer rate, Long Term Evolution Advanced (LTE-A) is expected to meet the demands for high transmission bandwidths in the future due to its various advantages, such as reduced transmission delay, increased data transfer rate, increased system throughput, and efficient use of spectrum and the like.

In order to achieve high transmission bandwidth, the use of a large segment of bandwidth is a direct way for improving the transmission bandwidth, but to find a large segment of unused bandwidth in the wireless network is not easy. Therefore, Carrier Aggregation (CA) technology is introduced into LTE-A, which is based on the existing carrier in Long Term Evolution (LTE), and a plurality of carriers are further aggregated to form a carrier with a larger bandwidth in order to meet the demand for high transmission bandwidth.

However, LTE-A specifies that a home base station (or a picocell base station) can have only one cell, and the home base station can only register with a Mobility Management Entity (MME) or a core network with the globally unique cell identity (CID) of the cell, so the home base station is unable to support the carrier aggregation technology.

Thus, under the existing framework of LTE-A, in order to allow a home base station to have a plurality of cells and thus support CA, the home base station can only register one of the plurality of cells, the MME will not know the existence of the other cells.

Thus, when a user equipment (UE) wishes to transfer from its eNB to an unregistered cell of the home base station, the MME will not be able to look up the routing information and cannot forward the handover request to the home base station. Furthermore, the home base station cannot correctly identify the cell to which the UE has transferred.

Therefore, there is a need for a solution that overcomes the aforementioned prior-art issues.

SUMMARY OF THE INVENTION

The present disclosure provides a home base station for supporting a plurality of cells under carrier aggregation, which may include: a preamble generator for allocating respective random access resources in the cells for handover to be carried out by a user equipment (UE), and upon receiving a handover request signal transmitted by a Mobility Management Entity (MME), generating a specific preamble and its transmission time, so that the UE performs random access on the cells based on the preamble and the transmission time to obtain the random access resources and sends out a Random Access Preamble (RAP); and a preamble monitor for enabling the cells to simultaneously monitor the RAP sent by the UE, and when one of the cells receiving the RAP, identifying the cell on which the UE camps based on which one of the cells that has the RAP.

The present disclosure also provides a method for supporting a plurality of cells under carrier aggregation, which may include the steps of: allowing a preamble generator of a home base station to allocate respective random access resources in the cells for handover to be carried out by a user equipment (UE), and upon receiving a handover request signal transmitted by a Mobility Management Entity (MME), generating a specific preamble and its transmission time to the UE; allowing the UE to perform random access on the cells based on the preamble and the transmission time to obtain the random access resources and sends out a Random Access Preamble (RAP); allowing a preamble monitor of the home base station to enable the cells to simultaneously monitor the RAP sent by the UE; and when one of the cells receiving the RAP, allowing the preamble monitor to identify the cell on which the UE camps based on which one of the cells has the RAP.

From the above, it is clear that the home base station and the method for supporting a plurality of cells under carrier aggregation in accordance with the present disclosure allocate random access resources in each of the plurality of cells, generate the preamble based on the handover request signal, and allow the cells to monitor the RAP sent by the UE simultaneously. When one of the cells receives the RAP, the home base station can identify the cell on which the UE camps based on the RAP. As such, the present disclosure allows the home base station to correctly identify the cell to which the UE has transferred based on the RAP, prevents the MME from failing to lookup routing information, and allows the MME to be able to forward the handover request signal to the home base station.

BRIEF DESCRIPTION OF DRAWINGS

The present disclosure can be more fully understood by reading the following detailed description of the preferred embodiments, with reference made to the accompanying drawings.

DETAILED DESCRIPTION

Figure 1:
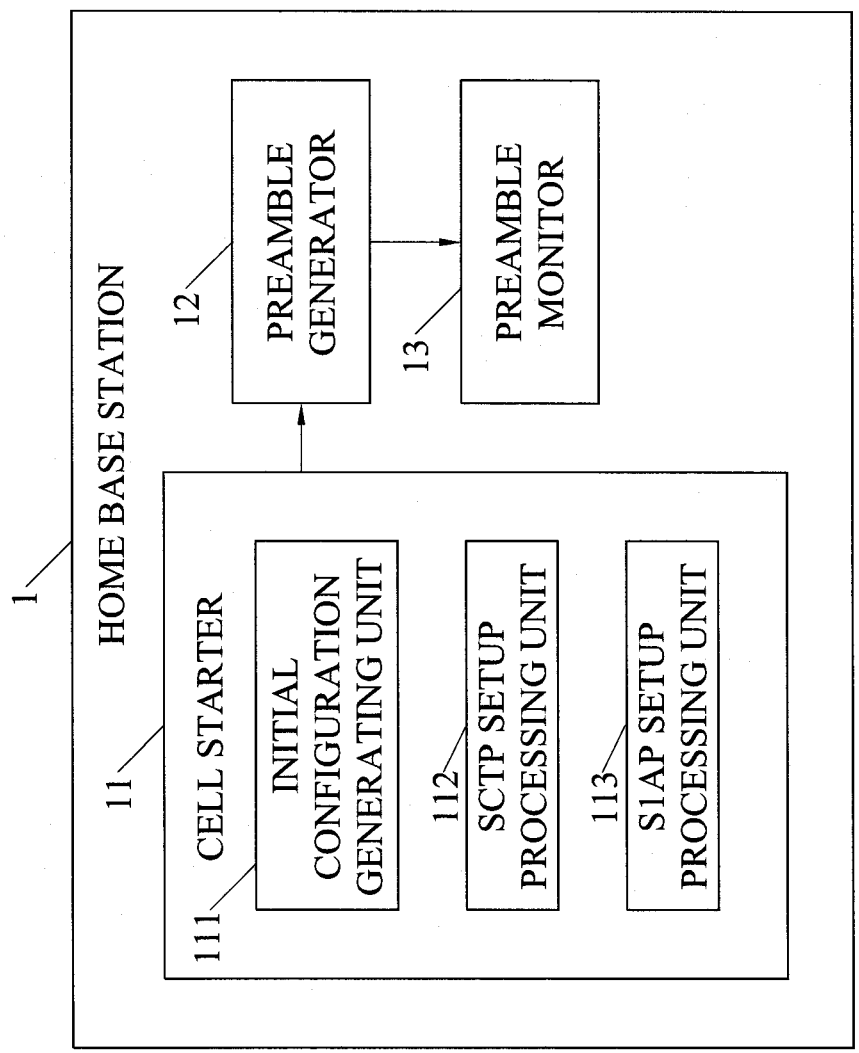
FIG. 1 is a block diagram illustrating a home base station for supporting a plurality of cells under carrier aggregation in accordance with the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a block diagram illustrating a home base station 1 for supporting a plurality of cells under carrier aggregation in accordance with the present disclosure. The home base station 1 is used as a target base station for a user equipment seeking handover. In an embodiment, the home base station 1 is a picocell or a femtocell base station or a base station supporting LTE (Long Term Evolution). In the present disclosure, a plurality of cells means two, three or more cells.

The home base station 1 includes a cell starter 11, a preamble generator 12, and a preamble monitor 13. The cell starter 11 may include an initial configuration generating unit 111, a SCTP (Stream Control Transmission Protocol) setup processing unit 112 and a S1AP (S1 Application Protocol) setup processing unit 113. The S1AP setup processing unit 113 is used for initializing and setting of the S1AP module.

Figure 2:
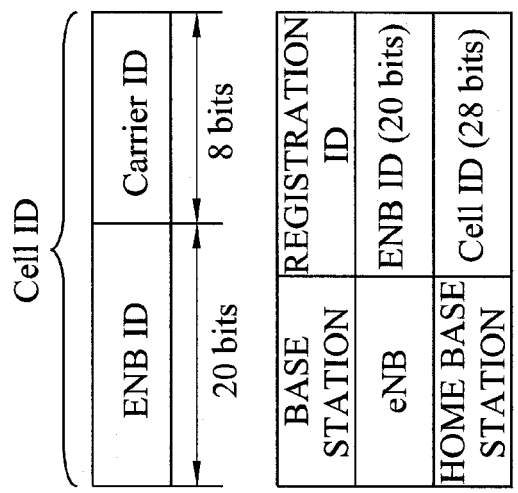
FIG. 2 is a schematic diagram illustrating the home base station for supporting a plurality of cells under carrier aggregation in accordance with the present disclosure registering with a Mobility Management Entity (MME) and handing over a user equipment (UE) to a cell.
Figure 2:
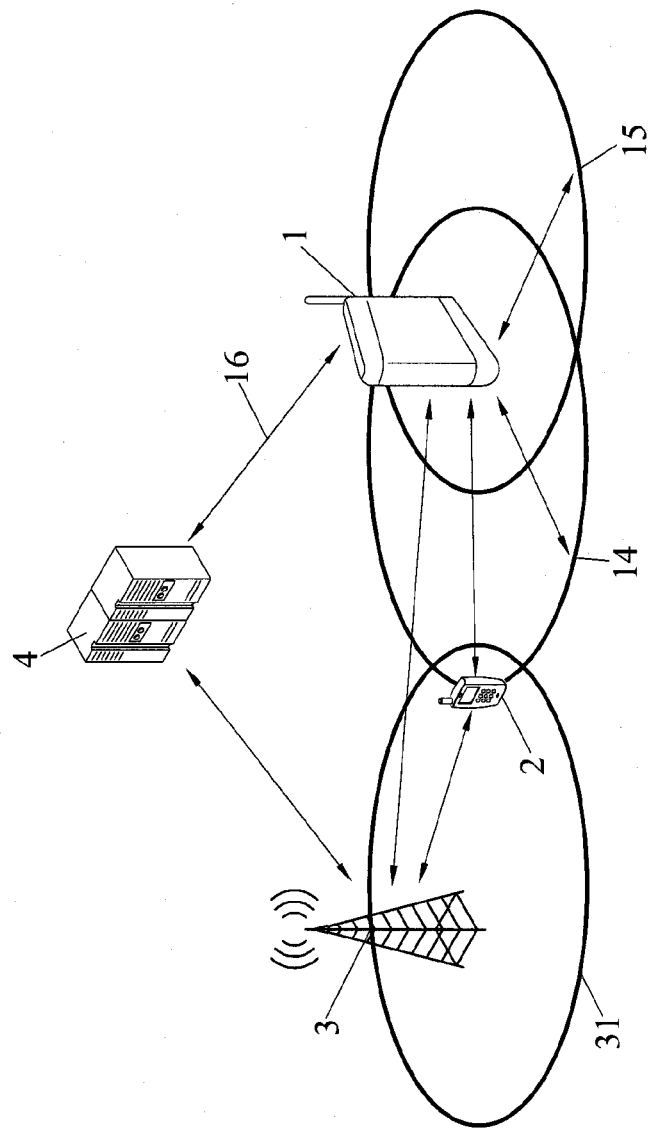

FIG. 2 is a schematic diagram illustrating the home base station for supporting a plurality of cells under carrier aggregation in accordance with the present disclosure registering with a MME (Mobility Management Entity) and handing over a UE (user equipment) to a cell.

As shown in FIG. 2 and FIG. 1 above, the initial configuration generating unit 111 designates both a first cell 14 and a second cell 15 with the same cell identity (CID). The CID may include a 20-bit eNB ID and an 8-bit carrier ID.

The SCTP setup processing unit 112 of the cell starter 11 registers with a MME 4 or a core network using the CID as the registration ID, so that a SCTP connection 16 is established between the first cell 14 (or the second cell 15) and the MME 4, and the first cell 14 and the second cell 15 share the SCTP connection 16. The home base station 1 broadcasts the CID and physical CIDs of the first cell 14 and the second cell 15.

The preamble generator 12 allocates random access resources in the first cell 14 and the second cell 15 that allow handover to be carried out by a UE 2. The resources can be, for example, wireless resources for contention-free Physical Random Access Channel (PRACH). More specifically, the preamble generator 12 allocates random access resources in the carriers based on the corresponding resource allocation periods of the first cell 14 and the second cell 15. The random access resources occurring at the same time in the carriers are used as the handover resources for the UE 2.

Upon receiving a handover request signal from the MME 4, the preamble generator 12 generates a specific preamble and its transmission time and transits them to the UE 2, so that the UE 2 carries out random access on the first cell 14 and the second cell 15 based on the received preamble and its transmission time to obtain the random access resources and send out a random access preamble (RAP).

When the preamble generator 12 sends a handover request permitted signal to an eNB 3 of the UE 2, the preamble monitor 13 enables the first cell 14 and the second cell 15 to monitor the RAP sent by the UE 2, and enables the first cell 14 and the second cell 15 to turn on their respective physical layers in order to prepare for or start receiving the RAP sent by the UE 2.

The eNB 3 mentioned above may be a macro base station, a picocell base station, a femtocell base station, or a base station supporting LTE-A. It registers with the MME 4 or the core network using a 20-bit eNB ID or a 20-bit CID as the registration ID.

If the first cell 14 receives the RAP, the preamble monitor 13 will confirm the validity of the RAP. If the RAP is valid, the first cell 14 will disable the monitoring action of the second cell 15, so that the second cell 15 will stop monitoring RAP. If the second cell 15 receives the RAP, the second cell 15 will disable the monitoring action of the first cell 14, so that the first cell 14 will stop monitoring RAP.

In an embodiment, the cell that receives the RAP may be the one with the best signal quality between the first cell 14 and the second cell 15. The preamble monitor 13 can identify the cell on which the UE 2 camps based on which one of the first cell 14 and the second cell 15 that has the RAP.

When the preamble monitor 13 receives a handover complete signal from the UE 2, for example, a RRCConnectionReconfigurationComplete signal, indicating that the UE 2 has successfully transferred from the cell 31 of the eNB 3 to the first cell 14 or the second cell 15 of the home base station 1, the preamble monitor 13 will release the handover resources in the carriers corresponding to the first cell 14 and the second cell 15.

Figure 3:
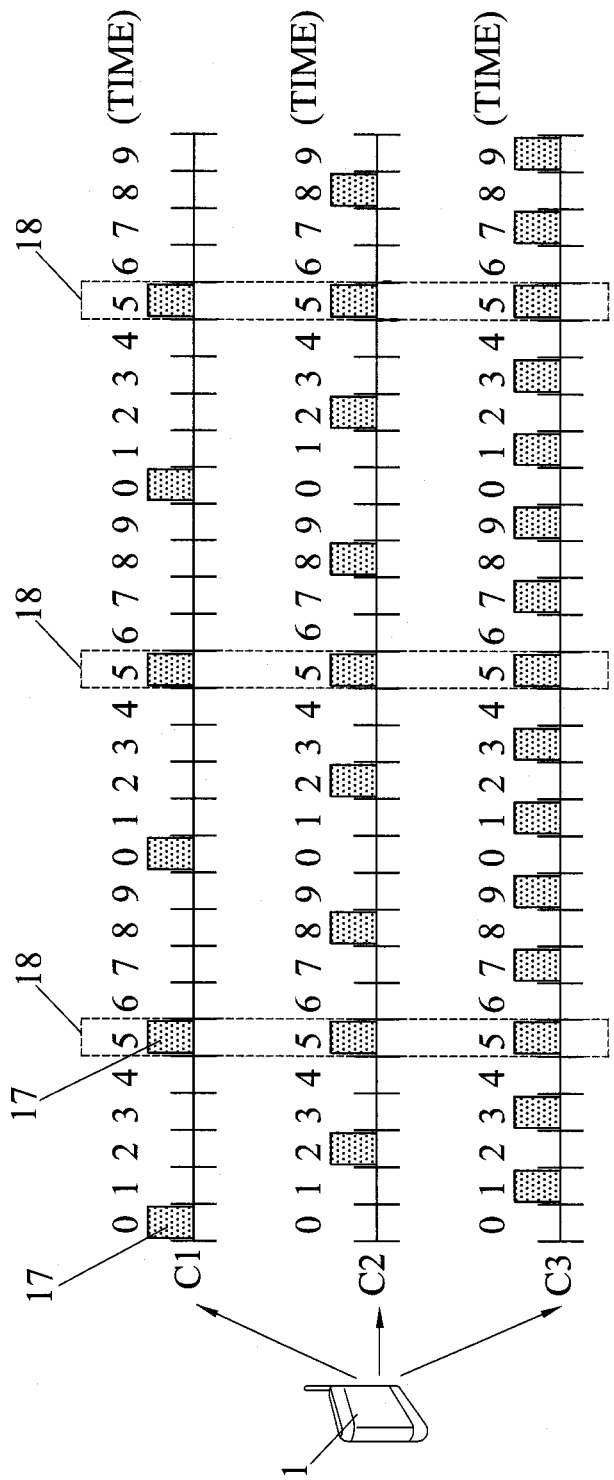
FIG. 3 is a schematic diagram illustrating the home base station for supporting a plurality of cells under carrier aggregation in accordance with the present disclosure allocating random access resources in various cells for handover of a UE.

FIG. 3 is a schematic diagram illustrating the home base station for supporting a plurality of cells under carrier aggregation in accordance with the present disclosure allocating random access resources in various cells for handover of a UE.

When a UE is ready to transfer from an eNB to the home base station 1, the preamble generator of the home base station 1 will allocate random access resources 17 (e.g., PRACH wireless resources) in a first carrier C1, a second carrier C2, and a third carrier C3 corresponding to three individual cells based on the resource allocation periods of the carriers C1 to C3, and use the random access resources occurring at the same time in the carriers C1 to C3 as handover resources 18 for the UE.

When the preamble monitor of the home base station 1 receives from the UE a handover complete signal such as a RRCConnectionReconfigurationComplete signal, the preamble monitor releases the handover resources 18 in the carriers C1 to C3 corresponding to the cells.

Figure 4:
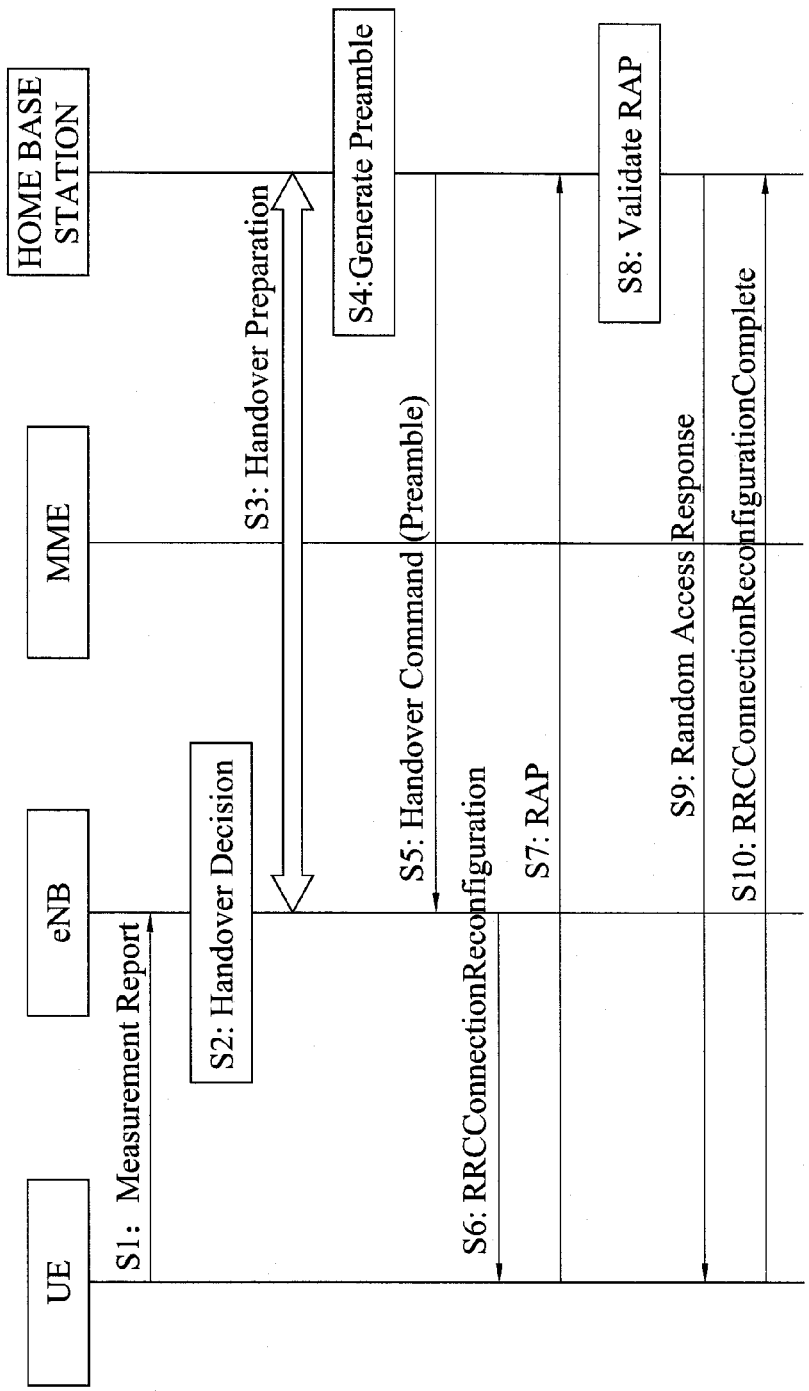
FIG. 4 is a flowchart illustrating the identification of a camped-on cell in the handover process of a UE by a home base station for supporting a plurality of cells under carrier aggregation in accordance with the present disclosure.

FIG. 4 is a flowchart illustrating the identification of a camped-on cell in the handover process of a UE by a home base station for supporting a plurality of cells under carrier aggregation in accordance with the present disclosure.

In step S1, the UE transmits a measurement report to an eNB. The measurement report may include the measured wireless signal strengths of the plurality of cells of the home base station, the CID broadcasted by these cells, and the like. Then, proceed to step S2.

In step S2, the eNB makes a handover decision based on the measurement report and the condition of the wireless network to determine whether to transfer the UE to the home base station. Then, proceed to step S3.

In step S3, the eNB transmits a handover request signal to a MME, which then transmits a handover request signal to the home base station according to the CID registered by the cells, so the home base station starts corresponding handover preparation and responds with a handover request permitted signal to the eNB to allow the eNB to handover the UE to itself. Then, proceed to step S4.

In step S4, a preamble generator of the home base station generates a specific preamble and its transmission time, and allocates in the respective carriers of the cells for the UE contention-free random access resources such as PRACH wireless resources, so that the UE may obtain air media resource of the home base station without contention. Then, proceed to step S5.

In step S5, the preamble generator of the home base station generates a Handover Command signal to transmit the preamble and its transmission time to the eNB. Then, proceed to step S6.

In step S6, the eNB transmits the preamble and its transmission time of the home base station to the UE through an RRCConnectionReconfiguration signal. Then, proceed to step S7.

In step S7, when the UE is switching from the eNB to the home base station, the UE carries out random access on the cells of the home base station based on the preamble and its transmission time of the home base station and transmits a random access preamble (RAP). Meanwhile, a preamble monitor of the home base station enables the cells to monitor the RAP transmitted by the UE, that is, the cells turn on their respective physical layer to wait for the connection of the UE. The duration of turning on of the physical layer can be 1 ms. Then, proceed to step S8.

In step S8, when one of the cells receives the RAP transmitted by the UE, and the UE is connected to one of the cells, the preamble monitor of the home base station confirms the validity of the RAP, and identifies the cell on which the UE camps based on which one of the cells has the RAP. Then, the cell that has received the preamble returns its CID to the Media Access Control (MAC) layer of the home base station to disable the monitoring actions of the RAP by other cells, and the other cells will stop monitoring the RAP. Then, proceed to step S9.

In step S9, the home base station returns a Random Access Response signal to the UE. Then, proceed to step S10.

In step S10, the UE responds to the home base station with an RRCConnectionReconfigurationComplete signal, indicating that the UE has successfully transferred from the eNB to the cell of the home base station. Meanwhile, the preamble monitor will release the handover resources in the carriers corresponding to the first cell and the second cell.

From the above, it is clear that the home base station and the method for supporting a plurality of cells under carrier aggregation in accordance with the present disclosure allocate random access resources in each of the plurality of cells, generate the preamble based on the handover request signal, and allow the cells to monitor the RAP sent by the UE simultaneously. When one of the cells receives the RAP, the home base station can identify the cell on which the UE camps based on the RAP. As such, the present disclosure allows the home base station to correctly identify the cell to which the UE has transferred based on the RAP, prevents the MME from failing to lookup routing information and allows the MME to be able to forward the handover request signal to the home base station.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A home base station for supporting a plurality of cells under carrier aggregation, comprising:
    a preamble generator for allocating respective random access resources in the cells for handover to be carried out by a user equipment (UE), and upon receiving a handover request signal transmitted by a Mobility Management Entity (MME), generating a specific preamble and its transmission time, so that the UE performs random access on the cells based on the preamble and the transmission time to obtain the random access resources and sends out a Random Access Preamble (RAP); and
    a preamble monitor for enabling the cells to simultaneously monitor the RAP sent by the UE, and when one of the cells receives the RAP, identifying the cell on which the UE camps based on which one of the cells that has the RAP,
    wherein the cell that receives the RAP disables monitoring actions of the other cells to stop the other cells from monitoring the RAP.

2. The home base station of claim 1, further comprising a cell starter including an initial configuration generating unit for designating the cells with the same cell identity (CID).

3. The home base station of claim 2, wherein the cell starter further includes a Stream Control Transmission Protocol (SCTP) setup processing unit for registering with the MME based on the CID of one of the cells to establish a SCTP connection between the cells and the MME.

4. The home base station of claim 1, wherein the preamble generator allocates the random access resources in carriers of the cells according to a resource allocation period of the cells, and uses the random access resources occurring at the same time in the carriers as handover resources for the UE.

5. The home base station of claim 1, wherein the random access resources are wireless resources for contention-free Physical Random Access Channel (PRACH).

6. The home base station of claim 1, wherein when the preamble generator transmits a handover request permitted signal to an eNB of the UE, the preamble monitor enables the cells to simultaneously turn on their respective physical layers in preparation for receiving the RAP sent by the UE.

7. The home base station of claim 1, wherein the cell that receives the RAP is the one that has the best signal quality among the cells.

8. The home base station of claim 1, wherein when the preamble monitor receives a handover complete signal from the UE, the preamble monitor releases handover resources in the carriers of the cells.

9. A method for supporting a plurality of cells under carrier aggregation, comprising:
    allocating, by a preamble generator of a home base station, respective random access resources in the cells for handover to be carried out by a user equipment (UE), and upon receiving a handover request signal transmitted by a Mobility Management Entity (MME), generating a specific preamble and its transmission time to the UE;
    performing, by the UE, random access on the cells based on the preamble and the transmission time to obtain the random access resources and sends out a Random Access Preamble (RAP);
    enabling, by a preamble monitor of the home base station, the cells to simultaneously monitor the RAP sent by the UE; and
    when one of the cells receives the RAP, identifying, by the preamble monitor, the cell on which the UE camps based on which one of the cells has the RAP, and disabling, by the cell that receives the RAP, monitoring actions of the other cells to stop the other cells from monitoring the RAP.

10. The method of claim 9, further comprising designating, by a cell starter of the home base station, the cells with the same cell identity (CID).

11. The method of claim 10, further comprising registering, by the cell starter, with the MME based on the CID of one of the cells to establish a SCTP connection between the cells and the MME.

12. The method of claim 9, wherein the preamble generator allocates the random access resources in carriers of the cells according to a resource allocation period of the cells, and uses the random access resources occurring at the same time in the carriers as handover resources for the UE.

13. The method of claim 9, wherein when the preamble generator transmits a handover request permitted signal to an eNB of the UE, enabling, by the preamble monitor, the cells to simultaneously turn on their respective physical layers in preparation for receiving the RAP sent by the UE.

14. The method of claim 9, wherein when the preamble monitor receives a handover complete signal from the UE, releasing, by the preamble monitor, handover resources in the carriers of the cells.

\* \* \* \* \*